Patented Aug. 4, 1925.

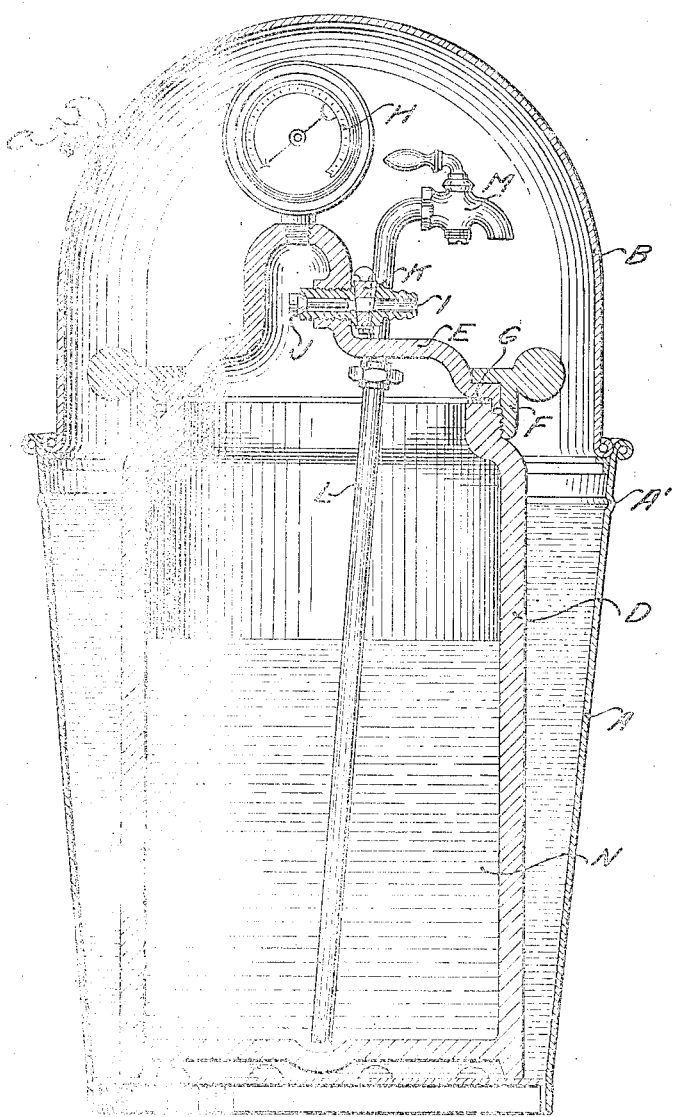

1,548,430

UNITED STATES PATENT OFFICE.

FRANK M. ASHLEY, OF BROOKLYN, NEW YORK.

FOOD PRODUCT AND PROCESS OF MAKING SAME.

Application filed July 9, 1921. Serial No. 483,473.

*To all whom it may concern:*

Be it known that FRANK M. ASHLEY, a citizen of the United States, and a resident of New York city, borough of Brooklyn, in the county of Kings and State of New York, has invented certain new and useful Improvements in Food Products and Processes of Making Same, of which the following is a specification.

My invention relates to food products and the object of my invention is to provide a new food or rather an old food preparation in a new form, and a novel method of making the same.

My invention may be described and better understood by referring to the drawing which forms a part of this specification which shows a vertical sectional view of an apparatus by means of which the new product is made and the new process carried out.

A, indicates a pail or receptacle provided with a closed cover B and a stop-cock C.

D, indicates a strong receptacle having a cover E which is held in steam tight relation to the receptacle D by a threaded ring F, a gasket G being interposed between the receptacle and cover to assist in making a tight joint.

The cover may be provided with a pressure gage H and an inlet passage I having a check valve J and a stop-cock K.

An outlet pipe L extends from the bottom of the cover nearly to the bottom of the receptacle and through the cover to a discharge valve M located above the same.

A fluid N consisting of cream in combination with other ingredients such for illustration as those used for making ice creams with their respective flavors, may be placed in the receptacle D and compressed air or carbonic acid gas is then introduced into the receptacle D through the passage I and the cream fluid charged with same by shaking or otherwise agitating the fluid until it is well charged with the gas. The pail A is then filled with ice or cold brine such as used to freeze ice in ice making apparatus and the fluid N cooled to almost the freezing point of the fluid in the closed receptacle D. When the valve M is opened the fluid is forced out by the gas in the receptacle above the fluid, and as it is discharged it is instantly frozen into a frost puff of relatively large volume due to the expansion of the gas with which it is charged and by reason of the said expansion of gas a refrigerating effect is produced causing the fluid to freeze in a volume many times greater than that of a corresponding amount of the fluid within the receptacle, thus providing a delicious product.

If it is desired to have the cream or fluid within the receptacle D keep for a considerable period of time to prevent it from becoming sour, I prefer to sterilize the fluid N before it is charged with the gas and this is carried out as follows.

Sufficient water is placed in the receptacle A so that the same will extend to a suitable height such as up to the line A' after the receptacle D is placed therein, containing the fluid N as shown, with or without some gas under pressure in the receptacle above the fluid N, and the water then boiled, the steam escaping through the stopcock C, and the fluid N thus sterilized, after which it may be cooled by the ice or brine application as before explained or by allowing running water flowing over it and then charged with the gas to the desired degree and after cooling to near the freezing point is ready for use as above set forth.

By the above process the cream fluid N is automatically and instantly converted from a fluid to a solid, its volume increased, and a new product provided.

For large commercial use and sale the receptacles D may be made of thin sheet metal or strong glass, and the fluid N placed therein and treated, the receptacles being provided with a simple discharge valve on a tube as indicated or with a valve located at the bottom of the receptacle and the receptacle delivered to the user without first cooling and the user can place the receptacle on ice or in a sufficiently cold refrigerator to cool it to the necessary degree to form the frozen puff when it is discharged from the receptacle and I have found some people who prefer it served below the freezing point. In this case I cool the fluid but not to the point where it freezes when discharged from the receptacle, but to a point where it is cold enough to form a puff that will stand firmly when discharged and in this condition it may be served as a dessert and for covering berries—pies, etc., and makes an excellent dish.

The fluid may be made to hold its form for a longer time if some gum tragacanth— or cornstarch or gelatin is added as an ingredient to the cream mixture while the cost of the fluid is also somewhat reduced for a given volume of the finished product.

Having thus described my invention I claim as new:

1. The process of treating a fluid comprising an ice cream mix to provide a food product consisting in charging the fluid with a suitable gas under pressure in a container, cooling the fluid nearly to its freezing point and then discharging the fluid from the container at or near its freezing point.

2. The process of treating a fluid comprising an ice cream mix to provide a food product consisting in sterilizing the fluid in a container charging the fluid with a suitable gas under pressure, cooling the fluid nearly to its freezing point and then discharging the fluid from the container at or near its freezing point.

3. A new product made from a fluid at or near the freezing temperature thereof comprising an ice cream mix impregnated with gas, in puff form.

4. A new product made from a fluid at or near the freezing temperature thereof comprising cream impregnated with gas, expanded in volume and solidified.

Signed at New York in the county of New York and State of New York this 7th day of July A. D.

FRANK M. ASHLEY.